United States Patent [19]
Nijland et al.

[11] Patent Number: 4,970,484
[45] Date of Patent: Nov. 13, 1990

[54] COMPOSITE ELASTOMER-TIPPED TUBULAR METALLIC DEVICE FOR ARMATURE AND NEEDLE VALVE APPLICATIONS

[75] Inventors: Peter L. J. Nijland, Losser; Dennis A. Boehmer, Xenia, Ohio

[73] Assignee: Vernay Laboratories, Inc., Yellow Springs, Ohio

[21] Appl. No.: 129,017

[22] Filed: Dec. 4, 1987

[51] Int. Cl.$^5$ .......................... H01F 7/08; H01F 3/00
[52] U.S. Cl. ........................... 335/279; 29/890.122; 29/890.127; 251/357; 335/280; 335/255
[58] Field of Search ............... 335/279, 280, 277, 257, 335/255, 248, 249, 157; 251/357, 333; 29/157.1 A, 157.1 R, 156.7

[56] References Cited

U.S. PATENT DOCUMENTS

| | | | |
|---|---|---|---|
| 586,038 | 7/1897 | Hope | 215/355 |
| 1,420,306 | 6/1922 | Cigol et al. | 427/280 |
| 2,364,107 | 12/1944 | Svirsky | 251/120 |
| 2,505,428 | 4/1950 | Pope | 124/73 |
| 3,559,325 | 2/1971 | Webster | 124/56 |
| 4,368,754 | 1/1983 | Roberts | 251/357 |

*Primary Examiner*—H. Broome
*Attorney, Agent, or Firm*—Biebel, French & Nauman

[57] ABSTRACT

A composite elastomer-tipped tubular metallic device for armature and check valve applications has a hollow tubular metal body and a generally spherical elastomer ball fitted into an end of the body so as to project outwardly beyond the body end. Also, the body of the device has a seat structure provided internally at the end thereof which is adapted to capture and retain the ball in the body end. In several embodiments of the device, the seat structure is defined by a pair of axially spaced annular ribs formed internally in the body at the end thereof, with the ribs projecting radially inwardly toward a central axis of the tubular body. In one embodiment, one of the ribs may be formed as a split ring received in an annular groove in an interior surface of the hollow body.

28 Claims, 3 Drawing Sheets

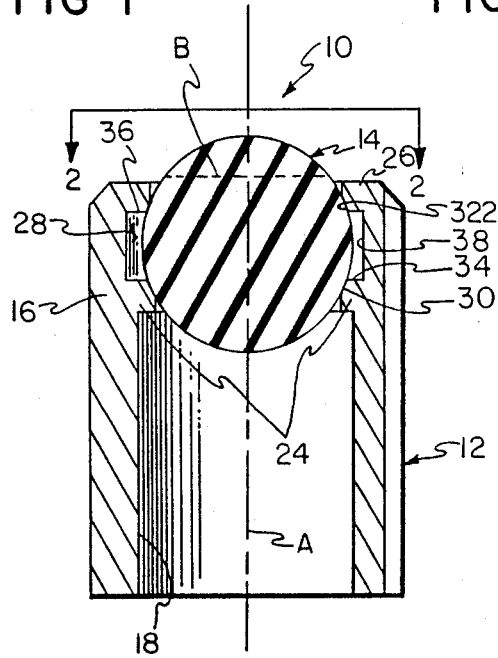
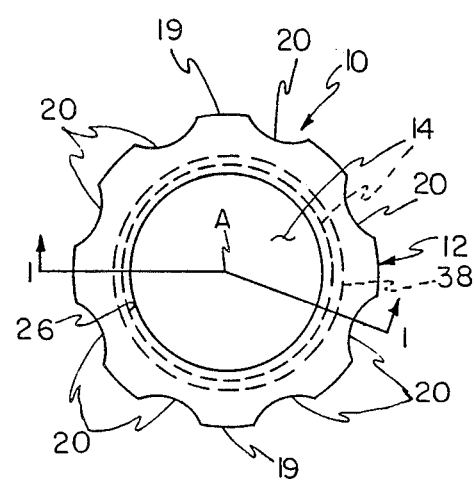
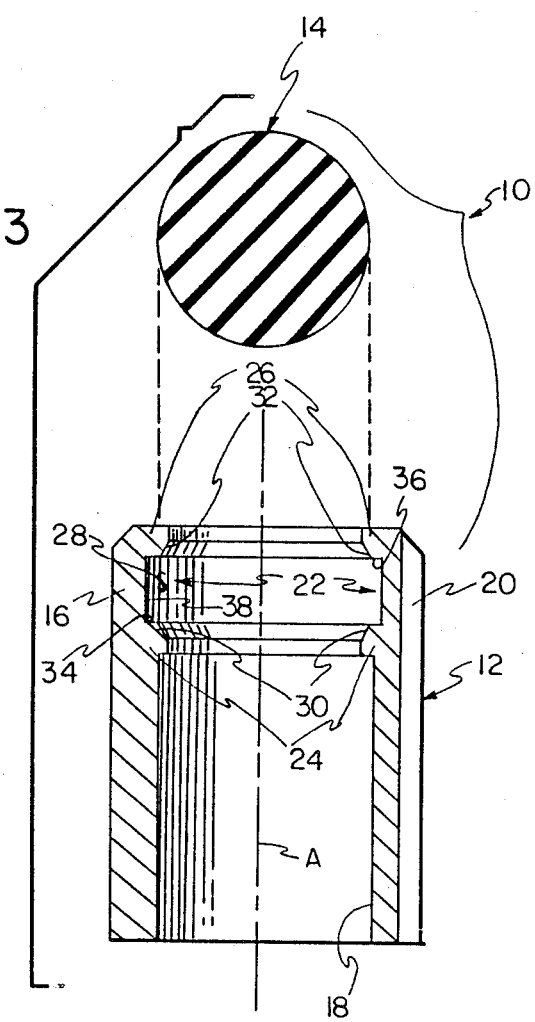

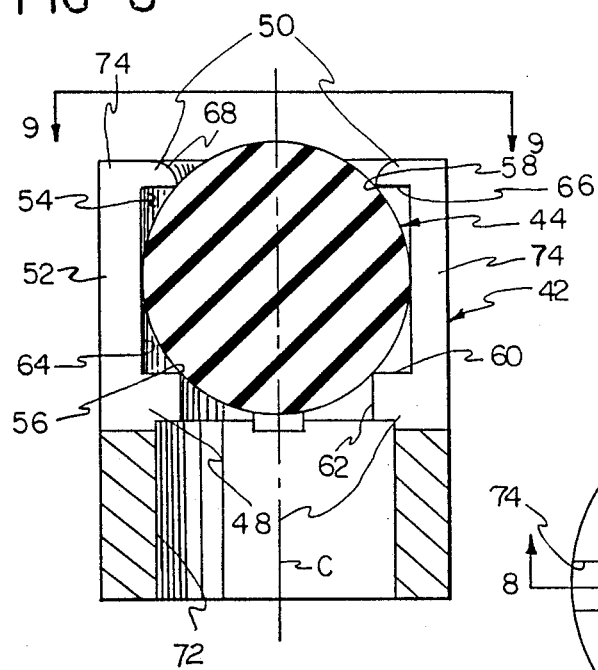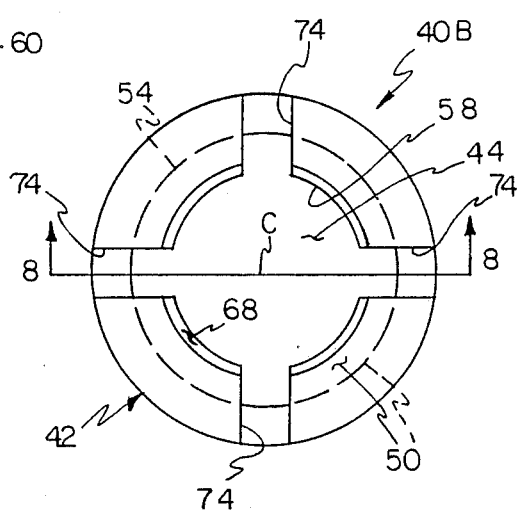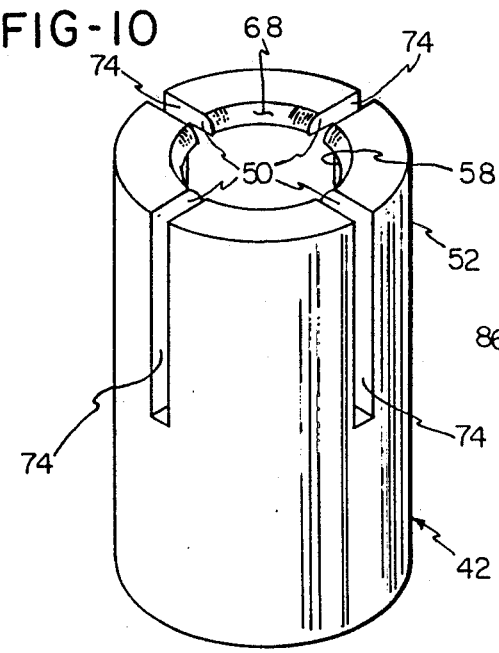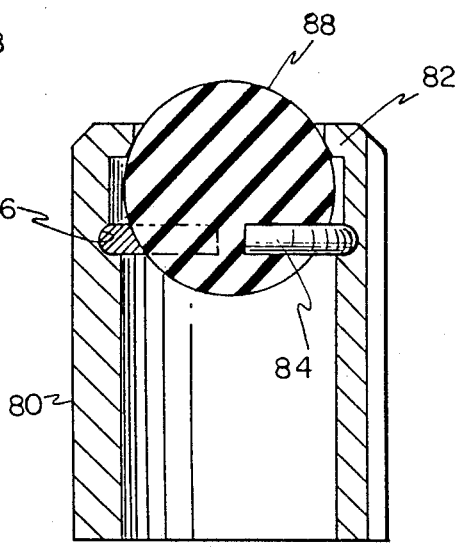

COMPOSITE ELASTOMER-TIPPED TUBULAR METALLIC DEVICE FOR ARMATURE AND NEEDLE VALVE APPLICATIONS

BACKGROUND OF THE INVENTION

The present invention relates generally to elastomer-tipped metallic devices such as armatures, needle valves and the like and, more particularly, to an improved composite construction thereof.

Elastomer-tipped metallic devices in a wide variety of configurations are currently used as plungers or armatures for electric solenoid assemblies and as needle valves in a diverse variety of applications. A typical device has a solid or tubular metal body with a cavity or seat formed in one end and a resilient elastomer tip molded or bonded in the cavity at the body end and projecting outwardly therefrom. The elastomer tip can provide a seal which eliminates leakage of fluids, can be an interface component which eliminates wear of other components and reduces impact noise levels, and is abrasion and impact resistant and compatible with a wide variety of fluids.

To be capable of operating satisfactorily in diverse applications such as sealing and controlling the flow of fuels, water, air, vacuum and refrigerant, these devices must meet extremely stringent design specifications in terms of precision and fine tolerances. At the same time, these devices are used worldwide and produced in the millions of units. Thus, the manufacturability of the devices is a major consideration. One conventional manufacturing process basically involves, first, fabricating the metal body. Next, the metal body is placed in a mold and the elastomer tip is molded and bonded onto one end of the body. Then, the rubber tip is ground to the configuration and fine tolerances desired.

While the above-described conventional manufacturing process has been successful over the years in producing devices in the large numbers and to the stringent design standards required, there is a continuing need to find a more simplified approach to the manufacture of such devices, while retaining the extremely high tolerances necessary for their successful operation.

SUMMARY OF THE INVENTION

The present invention provides an elastomer-tipped, tubular metallic device having a composite construction designed to satisfy the aforementioned needs. The composite construction of the device of the present invention greatly simplifies the manufacture of high precision armatures and needle valves through the independent production of its individual components to close tolerances. Thus, the composite construction is an assembly of two parts manufactured independently: namely, a hollow tubular body and a generally round elastomer element in the form of a sphere or ball which is press fitted or captured in the body. The hollow tubular body has a seat formed internally at one of its ends which is adapted to capture the spherical elastomer ball upon mounting of the same therein.

Accordingly, the present invention is directed to a composite, elastomer-tipped tubular metallic device for armature and check valve applications which comprises: (a) a hollow tubular body; and (b) a generally round elastomer element secured in an end of the body and precisely located with resect thereto The body is preferably metallic for armature applications and the elastomer element is preferably a solid spherical ball. The body has a seat structure provided internally at the end thereof. The seat structure is adapted to capture and retain the elastomer element in the body end after the element is secured therein More particularly, in most embodiments of the device of the present invention, the seat structure is defined by a pair of axially spaced annular ribs formed internally in the body at the end thereof. The ribs project radially inwardly toward a central axis of the tubular body and form an annular recess therebetween. In one embodiment, the ribs have respective annular surfaces engaging the elastomer element which surfaces lie in planes which diverge from one another as the planes extend toward and intersect at acute angles the central axis of the body. In another embodiment, the ribs have respective annular edges which engage the elastomer element.

Additionally, in some embodiments, the body of the device has at least one groove formed internally therein and opening toward the central axis of the body. The groove extends generally parallel to the central axis of the body and defines a passage bypassing the elastomer element captured by the seat structure. Where the seat structure is in the form of ribs, the groove also intersects the ribs.

In a different embodiment, the body of the device has at least one slot formed internally therein and opening both toward a central axis of the body and away therefrom at the exterior of the body. The slot extends generally parallel to the central axis of the body and defines a passage bypassing the elastomer element captured by the seat structure. Where the seat structure is in the form of ribs, the slot intersects the ribs.

In yet another embodiment, the seat structure is one annular rib formed internally in the body at the end thereof. The rib projects radially inwardly toward the central axis of the body. A split ring is received in an annular groove formed on an interior surface of the body, and the ring thus functions as a second annular rib. The first rib can be defined by a plurality of alternating rib segments and cutout regions in the rib.

Accordingly, it is an object of the present invention to provide an elastomer-tipped tubular metallic device having a composite construction which simplifies manufacture thereof; to provide an elastomer-tipped tubular metallic device having a composite construction which attains the high precision achieved heretofore; to provide a composite elastomer-tipped tubular metallic device which is assembled from two parts manufactured independently: namely, a hollow tubular body and a generally round elastomer element and to provide a composite elastomer-tipped tubular metallic device wherein the device is assembled simply by securing the elastomer element into an end of the hollow tubular body.

By manufacturing the balls and hollow bodies independently, each can be manufactured to very close tolerances, so that the composite structure will inherently be of much higher tolerances than conventional molded constructions.

BRIEF DESCRIPTION OF THE DRAWINGS

FIG. 1 is a longitudinal axial sectional view of a first embodiment of a composite elastomer-tipped tubular metallic device of the present invention taken along line 1—1 of FIG. 2;

FIG. 2 is a top plan view of the composite device as seen along line 2—2 of FIG. 1;

FIG. 3 is a view similar to that of FIG. 1 but showing the composite device in unassembled condition;

FIG. 8 is a longitudinal axial sectional view of a fourth embodiment of the composite device of the present invention taken along line 8—8 of FIG. 9;

FIG. 9 is a top plan view of the composite device as seen along line 9—9 of FIG. 8;

FIG. 10 is a perspective view of the body of the composite device of FIG. 8 on a slightly reduced scale; and FIG. 11 is an elevational view, partly in section, showing a fifth preferred embodiment of the invention.

DETAILED DESCRIPTION OF THE PREFERRED EMBODIMENTS

Figure 4:
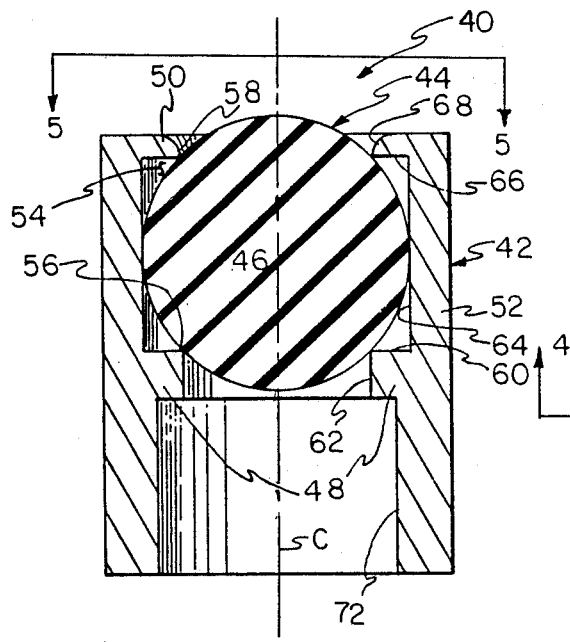
FIG. 4 is a longitudinal axial sectional view of a second embodiment of the composite device of the present invention taken along line 4—4 of FIG. 5.

Reference is made to FIGS. 1-3 of the drawings which illustrate, in assembled and unassembled conditions, an elastomer-tipped tubular metallic device, being generally designated 10, which comprises one of the preferred embodiments of the present invention. The device 10 is particularly useful as a resilient elastomer-tipped plunger or armature in an electric solenoid assembly; however, a device having this basic construction can also be configured as a resilient elastomer-tipped check valve. A wide variety of applications exist for the device 10, for example sealing and controlling the flow of air, water, fuels, vacuum, refrigerants, etc.

The composite tubular device 10 basically includes a tubular body 12 and a generally round elastomer element 14 assembled into an end 16 of the body 12 so as to be precisely located relative to the body 16. The body 12 can be manufactured by known processes and preferably is composed of all metal, such as steel, brass or aluminum. However, it could also be plastic with a metal bushing around it, or other composite construction. The round elastomer element 14 can preferably be in the form of an elastomer ball marketed under the trademark V-BALL ® by Vernay Laboratories, Inc. of Yellow Springs, Ohio, the assignee of the present invention.

Such spherical elastomer balls may be molded from several different compounds, such as, for example, Buna N (butadiene-acrylonitrile copolymer), EPDM (ethylene propylene diene Terpolymer), Vitron/Fluorel (copolymer of vinylidene fluoride and hexafluoropropylene, silicone, thermoplastic elastomers, etc.). It should be understood that for certain applications of the device 10, a substantial amount of the exposed portion of the round elastomer element 14 will be ground away down to the dashed line B shown in FIG. 1. However, it is intended that the meaning of the term "round" as used herein shall also include such configuration of the element 14 and other configurations of the exposed portion of the element as well.

The tubular body 12 of the composite tubular device 10 has an overall hollow cylindrical configuration with a central bore 18 defined therethrough. The body 12 can have a plurality of circumferentially spaced splines 19 defined by grooves 20 formed about the exterior thereof which extend generally parallel to a longitudinal central axis A of the body 12. To capture and retain the round elastomer element 14 in the body 12 after being mounted therein, the body 12 has a seat structure, generally indicated at 22, provided internally of the body 12.

The seat structure 22 is defined by a pair of axially spaced inner and outer annular ribs 24, 26 formed internally and integrally in the body 12 at the one end 16 thereof. The annular ribs 24, 26 project radially inwardly toward the central axis A of the tubular body 12 and define an annular recess 28 therebetween internally of the body. The annular ribs 24, 26 have respective annular elastomer element-engaging surfaces 30, 32 lying in planes which diverge from one another as those planes extend toward the central axis A of the body 12 and intersect the central axis A at acute angles.

The annular recess 28 is defined by facing annular side surfaces 34, 36 of the respective ribs 24, 26 and an annular bottom surface 38 extending therebetween. In the first embodiment of the device 10 shown in FIG. 1, the bottom surface 38 of the recess 28 is spaced from, and thus is not contacted by, the elastomer element 14.

Figure 5:
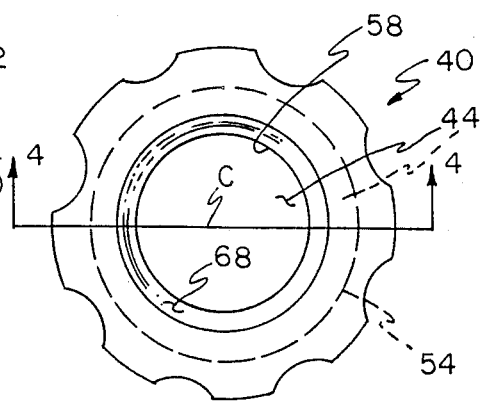
FIG. 5 is a top plan view of the composite device as seen along line 5—5 of FIG. 4.

Referring now to FIGS. 4 and 5, there is shown a second embodiment of the composite device of the present invention, generally designated 40. Being similar in construction to the device 10, the composite device 40 includes a hollow tubular body 42, a round elastomer element 44 in the form of a spherical ball press fitted therein, and a seat structure 46 capturing and retaining the element 44 therein. Similar to the seat structure 22 on the body 16, the seat structure 46 on the body 42 is defined by a pair of axially spaced inner and outer ribs 48, 50 integrally formed internally of the body 42 at its one end 52 and defining a recess 54 therebetween.

In contrast to the ribs 24, 26 on the body 16, the ribs 48, 50 on the body 42 have respective annular edges 56, 58 which engage the elastomer element 44. Specifically, the edge 56 on the inner rib 48 is defined at the intersection of an annular side surface 60 on the rib 48 which bounds one side of the recess 54 and an annular cylindrical surface 62 on the rib 48 which faces toward the central axis C of the body 42. The edge 58 on the outer rib 50 is defined at the intersection of an annular side surface 66 on the rib 50 which bounds an opposite side of the recess 54 and an inwardly and downwardly tapered surface 68 on the rib 50.

Figure 6:
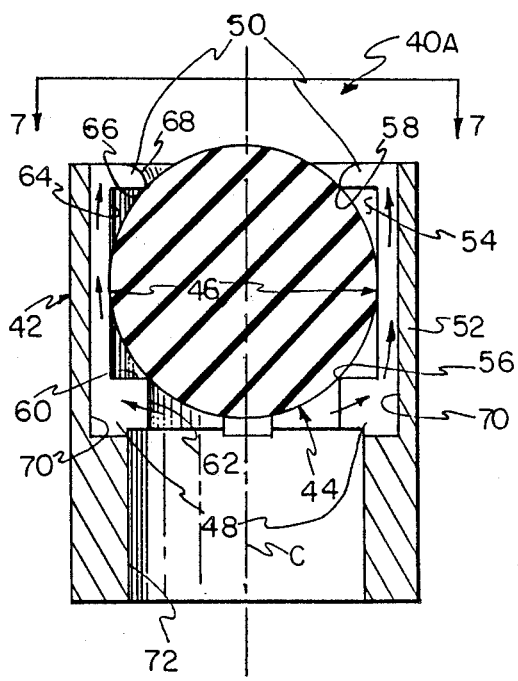
FIG. 6 is a longitudinal axial sectional view of a third embodiment of the composite device of the present invention taken along line 6—6 of FIG. 7.
Figure 7:
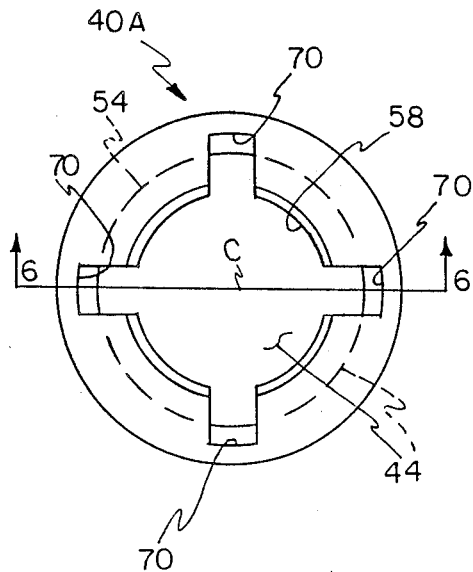
FIG. 7 is a top plan view of the composite device as seen along line 7—7 of FIG. 6.

FIGS. 6 and 7 illustrate a third embodiment of the composite tubular device of the present invention, generally designated 40A, whose structural features (with the exception of one) are identical to those of the second embodiment of FIGS. 4 and 5 and so are identified by the same reference numerals. The one structural feature not present in the device 40 of second embodiment, is a plurality of grooves 70 defined in the device 40A of the third embodiment. The grooves 70 are formed internally therein along approximately one-half the length of the body 40 which is coextensive with the one end 52 of the body having the seat structure 46 integrally formed thereon.

Each of the grooves 70 opens toward the central axis B of the body 42, intersects and cuts through the ribs 48, 50 and extends generally parallel to the body central axis B. Since the central bore 72 of the body 42 is blocked by the elastomer element 44 captured and retained by the ribs 48, 50 of the seat structure 46, each groove 70 being in communication with the central bore 72 and the exterior of the body 42 at the one end 52 thereof defines a passage bypassing the elastomer element 44 allowing flow of fluids past the element as depicted by the arrows in FIG. 6.

FIGS. 8-10 illustrate a fourth embodiment of the composite tubular device of the present invention, generally designated 40B, whose structural features (with the exception of one) are identical to those of the second and third embodiments of FIGS. 4-5 and 6-7 and so are identified by the same reference numerals. The one structural feature of the device 40B which is absent from device 10 but only slightly different from the grooves 70 of the device 40A is a plurality of slots 74 defined in the device 40B of the fourth embodiment.

The slots 74 are formed internally therein along approximately one-half the length of the body 40 which is coextensive with the one end 52 of the body having the seat structure 46 integrally formed thereon. Each of the slots 74 opens both toward the central axis C of the body 42 and away therefrom at the exterior of the body 42, and intersects with and cuts through the ribs 48, 50. Also, each slot 74 extends generally parallel to the central axis C of the body 42 and defines a passage bypassing the elastomer element 44 captured by the seat structure 46.

FIG. 11 shows a fifth preferred embodiment of the invention wherein a hollow body 80 has an annular, inwardly projecting rib 82 projecting inwardly and cooperating with a split ring 84 received in an annular groove 86 to capture a ball 88. In this regard, ring 84 functions similarly to the rib 24 of the embodiment of FIGS. 1-3.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A composite elastomer-tipped tubular device for armature and check valve applications, comprising:
   (a) an elongated tubular body;
   (b) a generally round elastomer element press fitted into an end of said body and projecting outwardly beyond said body; and
   (c) at least one annular rib defining a seat structure formed internally in said tubular body at said end of said body for capturing and retaining said elastomer element in said body end.

2. The device of claim 1 wherein said body is hollow and composed of a metallic material.

3. The device of claim 1 wherein said round elastomer element is in the form of a solid spherical ball.

4. The device of claim 1 wherein said seat structure has an annular bottom which engages said elastomer element.

5. The device of claim 1 wherein said seat structure has an annular bottom which is spaced from said elastomer element.

6. A composite elastomer-tipped tubular device for armature and check valve applications, comprising:
   an elongated tubular body; and
   a generally round elastomer element press fitted into an end of said body and projecting outwardly beyond said body;
   wherein said body has a seat structure provided internally at said end thereof which captures and retains said elastomer element in said body end; and
   wherein said seat structure is defined by a pair of axially spaced annular ribs formed internally in said body at said end thereof, said ribs projecting radially inwardly toward a central axis of said tubular body.

7. The device of claim 6 wherein one of said ribs is formed as a split ring received in an annular groove formed in an inner surface of said body.

8. The device of claim 6 wherein said pair of annular ribs define a recess formed internally in said tubular body at said end thereof 9. The device of claim 8 wherein said ribs have respective annular elastomer element-engaging surfaces lying in planes which diverge from one another as said planes extend toward and intersect at acute angles said central axis of said body.

10. The device of claim 8 wherein said ribs have respective annular edges which engage said elastomer element.

11. A composite elastomer-tipped tubular device for armature and check valve applications, comprising:
   an elongated tubular body, and
   a generally round elastomer element press fitted into an end of said body and projecting outwardly beyond said body end;
   wherein said body has a seat structure provided internally at said end thereof which captures and retains said elastomer element in said body end;
   wherein said body has at least one groove formed internally therein and opening toward a central axis of said body, said groove extending generally parallel to said central axis of said body and defining a passage bypassing said elastomer element captured by said seat structure.

12. The device of claim 11 wherein said body has a central bore which is blocked by said elastomer element captured by said seat structure defined at said body end, said groove being in communication with said bore and with the exterior of said body at said end thereof.

13. The device of claim 12 wherein said seat structure is defined by a pair of axially spaced annular ribs formed internally in said body at said end thereof, said ribs projecting radially inwardly toward said central axis of said tubular body.

14. The device of claim 13 wherein said at least one groove intersects said ribs.

15. A composite elastomer-tipped tubular device for armature and check valve applications, comprising:
   an elongated tubular body; and
   a generally round elastomer element press fitted into an end of said body and projecting outwardly beyond said body end;
   wherein said body has a seat structure provided internally at said end thereof which captures and retains said elastomer element in said body end; and
   wherein said body has at least one slot formed internally therein and opening both toward a central axis of said body and away therefrom at the exterior of said body, said slot extending generally parallel to said central axis of said body and defining a passage bypassing said elastomer element captured by said seat structure.

16. The device of claim 15 wherein said body has a central bore which is blocked by said elastomer element captured by said seat structure defined at said body end, said slot being in communication with said bore and with the exterior of said body at said end and side thereof.

17. The device of claim 15 wherein said seat structure is defined by a pair of axially spaced annular ribs formed internally in said body at said end thereof, ribs projecting radially inwardly toward said central axis of said tubular body.

18. The device of claim 17 wherein said at least one slot intersects said ribs.

19. A composite elastomer-tipped device for armature and check valve applications, comprising:
   an elongated tubular body; and
   a generally round elastomer element press fitted into an end of said body and projecting outwardly beyond said body end;
   wherein said body has a seat structure provided internally at said end thereof which captures and retains said elastomer element in said body end; and
   wherein said seat structure is defined by at least one annular rib formed internally in said body at said end thereof, said rib projecting radially inwardly toward a central axis of said tubular body.

20. The device of claim 19 wherein said body has a central bore which is blocked by said elastomer element captured by said seat structure defined at said body end.

21. A composite elastomer-tipped tubular device for armature and check valve applications, comprising
   an elongated tubular body; and
   a generally round elastomer element press fitted into an end of said body and projecting outwardly beyond said body end;
   wherein said body has a seat structure provided internally at said end thereof which captures and retains said elastomer element in said body end;
   wherein said seat structure is defined by at least one annular rib formed internally in said body at said end thereof, said rib projecting radially inwardly toward a central axis of said tubular body; and
   wherein said annular rib is defined by a plurality of alternating rib segments and cutout regions in said rib.

22. The device of claim 19 wherein said body has at least one groove formed internally therein and opening toward a central axis of said body, said groove extending generally parallel to a central axis of said body and defining a passage bypassing said elastomer element captured by said seat structure.

23. A composite elastomer-tipped metallic device for armature and needle valve applications, comprising:
   (a) a hollow tubular metal body;
   (b) a generally solid spherical elastomer ball fitted into an end of said body so as to project outwardly beyond said body end; and
   (c) a seat structure defined by at least one annular rib formed internally in said body which is adapted to capture and retain said ball in said body end.

24. A composite elastomer-tipped tubular metallic device for armature and needle valve applications, comprising:
   a hollow tubular metal body;
   a generally solid spherical elastomer ball fitted into an end of said body so as to project outwardly beyond said body end; and
   a seat structure provided internally at said body end which is adapted to capture and retain said ball in said body end;
   wherein said seat structure is defined by a pair of axially spaced annular ribs formed internally in said body at said end thereof, said ribs projecting radially inwardly toward a central axis of said tubular body.

25. The device of claim 24 wherein said pair of annular ribs define a recess formed internally in said tubular body at said end thereof.

26. The device of claim 24 wherein said body has at least one groove formed internally therein and opening toward a central axis of said body, said groove extending generally parallel to said central axis of said body and intersecting said ribs so as to define a passage bypassing said ball captured by said seat structure.

27. The device of claim 23 wherein said seat structure is defined by more than one annular rib formed internally in said body at said end thereof, said rib projecting radially inwardly toward a central axis of said tubular body.

28. A composite elastomer-tipped tubular metallic device for armature and needle valve applications, comprising:
   a hollow tubular metal body;
   a generally solid spherical elastomer ball fitted into an end of said body so as to project outwardly beyond said body end; and
   a seat structure provided internally at said body end which is adapted to capture and retain said ball in said body end;
   wherein said seat structure is defined by at least one annular rib formed internally in said body at said end thereof, said rib projecting radially inwardly toward a central axis of said tubular body;
   wherein said annular rib is defined by a plurality of alternating rib segments and cutout regions in said rib.

* * * * *